Jan. 2, 1923.
J. P. FIELD.
STEERING GEAR CENTERING DEVICE.
FILED MAY 19, 1921.
1,441,148.
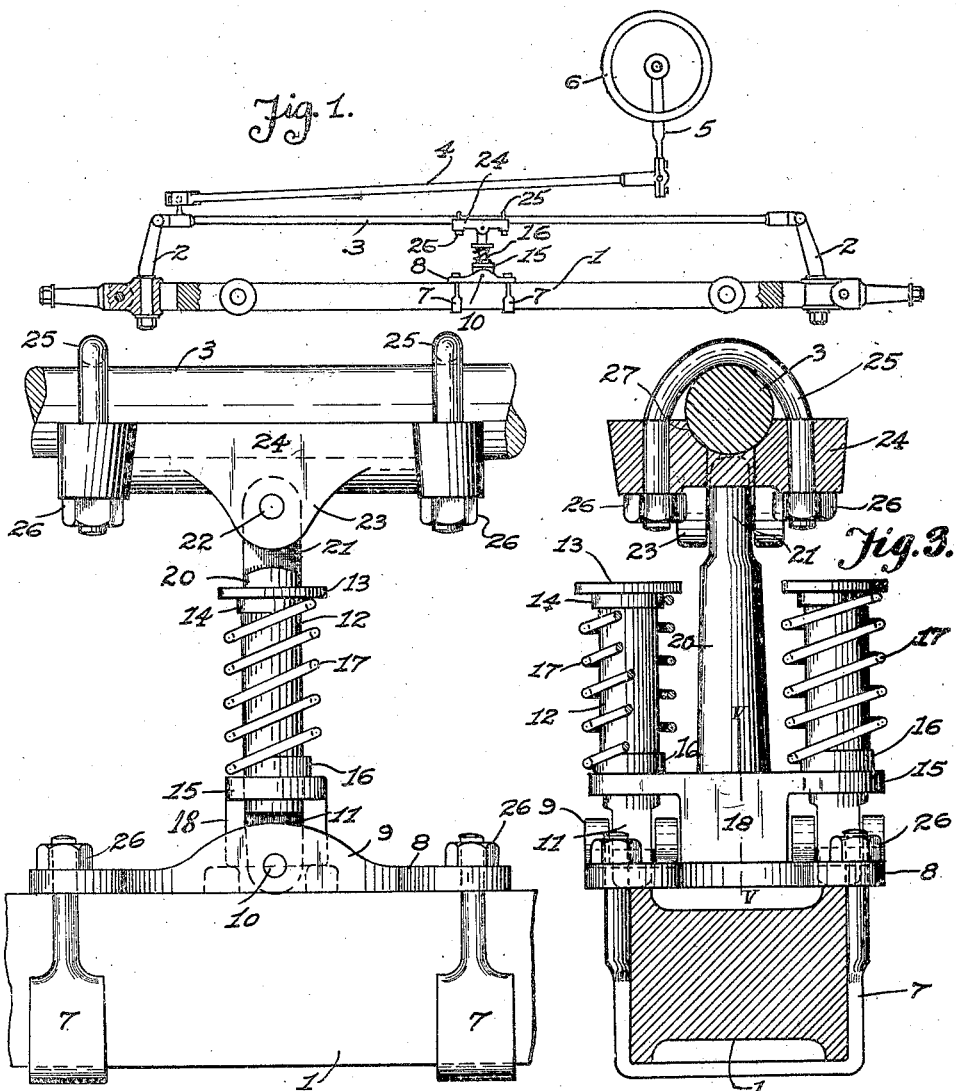
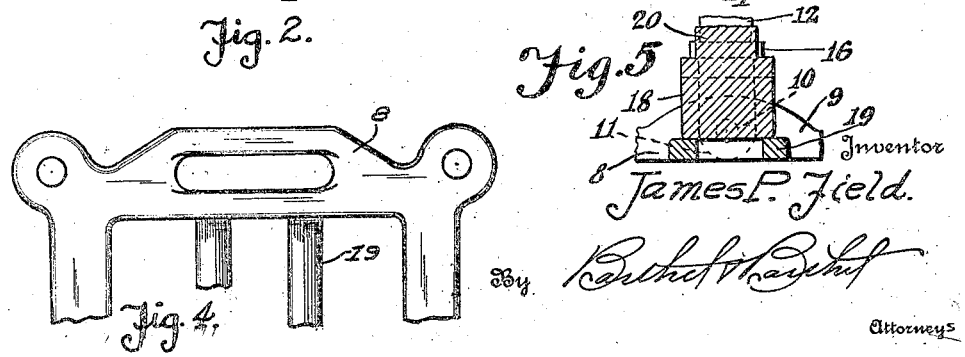
Inventor
James P. Field.
By
Attorneys Patented Jan. 2, 1923.

1,441,148

UNITED STATES PATENT OFFICE.

JAMES P. FIELD, OF DETROIT, MICHIGAN.

STEERING-GEAR CENTERING DEVICE.

Application filed May 19, 1921. Serial No. 470,941.

*To all whom it may concern:*

Be it known that I, JAMES P. FIELD, a citizen of the United States of America, residing at Detroit, in the county of Wayne and State of Michigan, have invented certain new and useful Improvements in Steering-Gear Centering Devices, of which the following is a specification, reference being had therein to the accompanying drawings.

This invention relates to a steering gear attachment and has special reference to a centralizing device applicable to the steering gear of an automobile or other motor driven vehicle to normally maintain the steering gear and the steering wheel of the vehicle in a straight-ahead position, thus relieving the driver or operator of an automobile of the constant strain and attention ordinarily required when operating an automobile. It is a well known fact that stones and other obstructions will deflect the steering wheels of an automobile and consequently a driver must retain a firm purchase on the steering wheel to keep the automobile in a defined lane of travel. Such gripping of the steering wheel is tiresome and nerve-racking. So to obviate such close attention on the part of the driver I have devised a simple, durable and inexpensive device that may be easily and quickly installed to yieldably hold the steering gear of an automobile in a position for straight-ahead travel. The centralizing device may be embodied in the running gear of an automobile, when manufactured, or as an attachment it may be installed without in the least changing any part of the steering gear.

The construction entering into the device will be hereinafter described and then claimed, and reference will now be had to the drawing, wherein Figure 1 is a plan of the device as forming part of a front axle and steering gear assembly;

Fig. 2 is an enlarged plan of the device;

Fig. 3 is a side elevation of the same, partly broken away and partly in section;

Fig. 4 is an elevation of a portion of an axle plate, and

Fig. 5 is a transverse sectional view taken on the line V—V of Fig. 3.

In the drawing, the reference numeral 1 denotes a front axle having its ends provided with steering knuckles 2 adapted for supporting steering wheels (not shown).

3 denotes a connecting rod articulating the steering knuckles 2 and coupled to said connecting rod is an arm 4 adapted to be actuated from a steering column assembly 5, which includes a steering wheel 6. The elements 1 to 6 inclusive are of a conventional form to be found in a well known type of automobile, and there is sufficient space between the axle 1 and the connecting rod 3 for my centralizing device.

Attached to the axle 1 intermediate the ends thereof, by U-bolts 7, clevises or other fastening means is a skeleton axle plate 8 provided with two sets of apertured lugs 9. Pivotally mounted between the lugs of each set, by a pin 10, is the reduced end 11 of a cylindrical guide rod 12 which has its opposite end provided with a head 13 and a collar or spring support 14. The guide rods 12 are disposed in parallelism and with the pivot pins 10 in vertical alinement the guide rods 12 may swing in an arc relative to the axle.

Slidable on the guide rods 12 is a cross-head 15 having its outer face provided with collars or spring supports 16 which confront the collars or spring supports 14 and co-operate therewith in supporting the end convolutions of coiled expansion springs 17 which encircle the guide rods 12 in spaced relation thereto. The expansive force of the springs 17 normally retains the cross-head 15 in proximity to the axle plate 8 and said cross-head has its inner face provided with an enlargement 18 extending between the sets of lugs 9.

The purpose of this enlargement is to relieve the guide rods 12 of the entire weight of the cross-head 15 as said enlargement may rest on the upper lug 9 of the lowermost set of lugs. The enlargement will also engage the axle plate 8 and serve as an abutment for the cross-head 15 when the centralizing device is in a straight-ahead position, and when assuming any other position, for instance, when the guide rods 12 are swung on their pivots, the enlargement 18 rocks on web portions 19 of the axle plate 8 and continues to brace the cross-head relative to the axle plate.

The outer face of the cross-head 15 has a central coupling member 20 which has its outer reduced end 21 pivotally mounted, by a pin 22, between apertured lugs or ears 23 carried by a rod engaging plate 24 which is connected to the rod 3 by U-bolts 25 and nuts 26 or other fastening means. The rod engaging plate 24 is of sufficient length to obtain a firm purchase on the rod 3 and for this purpose has a seat 27 for the rod 3. With the bolts 25 at the ends of the plate 24, said plate will be firmly held in engagement with the rod 3 to move therewith.

By reference to Figs. 1 and 2, showing the device in a straight-ahead position, it will be noted that the expansive force of the springs 17 retain the coupling member 20 at approximately a right angle to the axle 1. But should the rod 3 be shifted either to the right or to the left, as when steering, the cross-head 15 must slide on the guide rods 12 and lend additional tension to the springs 17. With these springs stressed, there is a constant tendency of the device to restore the connecting rod 3 to its normal position and such adjustment will take place when the steering wheels permit and without manual adjustment of the steering wheel 6. The springs 17 do not interfere materially with the adjustment of the connecting rod 3 by the steering wheel and the device simply constitutes a yieldable connection between the axle 1 and the connecting rod for preventing constant vibration of the connecting rod or accidental shifting thereof to the extent of requiring constant attention and a firm purchase on the steering wheel 6 when the lane of travel is straight or approximately so.

It is thought that the utility of my invention will be apparent without further description, and while in the drawing there is illustrated a preferred embodiment of my invention, it is to be understood that the structural elements are susceptible to such changes as fall within the scope of the appended claims.

What I claim is:—

1. A centralizing device adapted to be installed between a vehicle axle and the connecting rod of a vehicle steering gear, comprising an axle engaging plate, a connecting rod engaging plate, pivoted guide rods carried by said axle engaging plate, a cross-head slidable on said guide rods, springs encircling said guide rods between the outer ends thereof and said cross-head, and a coupling member carried by said cross-head and pivotally connected to said connecting rod engaging plate, said coupling member being normally between said guide rods and in the same vertical plane thereof.

2. A centralizing device as in claim 1, characterized by an enlargement on the rear face of said cross-head in alinement with said coupling member and normally engaging said axle plate.

3. A centralizing device as in claim 1, characterized by said guide rods and said cross-head having collars supporting the end convolutions of said springs in spaced relation to said guide rods.

In testimony whereof I affix my signature in presence of two witnesses.

JAMES P. FIELD.

Witnesses:
ANNA M. DORR,
KARL H. BUTLER.